United States Patent [19]

McAnlis et al.

[11] Patent Number: 4,458,307

[45] Date of Patent: Jul. 3, 1984

[54] DATA PROCESSOR SYSTEM INCLUDING DATA-SAVE CONTROLLER FOR PROTECTION AGAINST LOSS OF VOLATILE MEMORY INFORMATION DURING POWER FAILURE

[75] Inventors: James C. McAnlis, Bangor, Northern Ireland; Kuldip Kumar, Gateshead, England; Robert T. M. Gould, Downington, Pa.

[73] Assignee: Burroughs Corporation, Detroit, Mich.

[21] Appl. No.: 112,976

[22] Filed: Jan. 17, 1980

Related U.S. Application Data

[63] Continuation-in-part of Ser. No. 944,481, Sep. 20, 1978, abandoned.

[30] Foreign Application Priority Data

Sep. 22, 1977 [GB] United Kingdom ............... 39465/77

[51] Int. Cl.³ .......................... G06F 1/00; G06F 13/00
[52] U.S. Cl. ..................................... 364/200; 365/228
[58] Field of Search ... 364/200 MS File, 900 MS File; 365/228, 229; 371/66, 10

[56] References Cited

U.S. PATENT DOCUMENTS

| 3,167,685 | 1/1965 | Bade et al. | 364/200 |
|---|---|---|---|
| 3,286,239 | 11/1966 | Thompson et al. | 364/200 |
| 3,321,747 | 5/1967 | Adamson | 364/200 |
| 3,810,116 | 5/1974 | Prohofsky | 365/228 |
| 3,916,390 | 10/1975 | Chang et al. | 365/228 |
| 3,959,778 | 5/1976 | Brette | 364/200 |
| 4,004,283 | 1/1977 | Bennett et al. | 364/200 |
| 4,075,693 | 2/1978 | Fox et al. | 364/200 |
| 4,096,560 | 6/1978 | Footh | 364/200 |
| 4,307,455 | 12/1981 | Juhasz et al. | 371/66 X |

OTHER PUBLICATIONS

IBM Tech. Discl. Bull., vol. 19, No. 11, Apr. 1977, "Auto Initial Microprogram Load", Houdek et al., pp. 4339–4346.
IBM Tech. Discl. Bull., vol. 18, No. 12, May 1976, "Power Out Warning Interrupt Circuit", Mong, pp. 4147–4149.
Chemical Instrumentation, vol. 7, No. 3, "A Minicomputer Power Fail Detection System", Rayside et al., 1976, pp. 211–218.

Primary Examiner—Eddie P. Chan
Attorney, Agent, or Firm—David G. Rasmussen; Kevin R. Peterson; Edmund M. Chung

[57] ABSTRACT

A data processing system, having a volatile main memory prepares for power supply failure, at the first instance of power supply potential falling below a predetermined limit, by readying its current task for restart, data-saving by storing the contents of volatile, processor registers in the main memory, and completing any non-postponable tasks. If power deficiency lasts for longer than a predetermined period, the memory is maintained by a battery power source if and only if data-saving has been completed. Restoration of power during the predetermined period causes instant reversal and restart, but after the elapse of the predetermined period, causes reversal and restart if and only if a data save has been completed, otherwise causing reinitialization.

6 Claims, 8 Drawing Figures

DATA PROCESSOR SYSTEM INCLUDING DATA-SAVE CONTROLLER FOR PROTECTION AGAINST LOSS OF VOLATILE MEMORY INFORMATION DURING POWER FAILURE

CROSS-REFERENCE TO RELATED APPLICATION

This is a continuation-in-part of application Ser. No. 944,481 filed Sept. 20, 1978.

The present invention relates to data processor systems, and particularly to such systems protected against loss of volatile memory information in the event of a failure in the main power supply.

Various techniques have been devised in data processing systems for protection against loss of volatile memory information during a power failure. Some known techniques include an arrangement whereby, upon the detection of a power failure, that is to say, the falling of the voltage of the primary power supply below a predetermined limit, the memory cycle already initiated is taken to completion, but all further memory cycles are inhibited. In other known techniques, auxiliary power is supplied to the whole system for a time after the loss of primary power, to allow for continued operation of the system. In still other systems, the contents of volatile memories are "dumped" into auxiliary, non-volatile stores.

It is not generally possible to cease the operations of a data processing system at any unpredictable instant with hope of recovery at a later time, namely, when primary power is restored, so as to continue operations as before. At the instant of "stopping", the beginnings and intermediate results of initiated operations are lost, necessitating a certain amount of retracking before a continuity of operations can be achieved. A processor, in order to achieve instantaneous and complete recovery from a power failure, or indeed, any other interruption to its operation, must have had time to put the contents of its various memories and registers in a state ready for a restart before paying attention to the matter of the interruption.

An auxiliary power supply is a costly and bulky piece of hardware, having little economic relevance as part of low cost, small systems. Further, the act of continuing to run a data processing system after a loss of primary power can only be sustained for a short period because of the large amounts of energy required. The question of how to deal with the loss of primary power is begged by being postponed, and, in the event of a sustained power failure, the auxiliary power supply offers no real solution.

The "dumping" of the contents of volatile memories into non-volatile peripheral stores offers a long term, real solution to the power failure problem. In the past, when nearly all memory employed by processing systems was of the non-volatile core variety, volatile memory, was restricted to a small number of processor buffers and registers. The transfer of the contents of these registers and buffers to peripheral store was thus rapid. Nowadays, the replacing of core store with volatile, semiconductor devices has caused the amount of data to be "dumped" to increase at least ten thousand fold. The time required for data transfer has thus increased enormously, and, if this solution is presently adopted, a whole system auxiliary power source is required to keep the data processing system active long enough to effect the necessary data transfer.

Accordingly, it is a first object of the present invention to provide a data processing system which provides itself with an early warning of an impending primary power failure, thereby giving itself sufficient time to execute an ordered shutdown routine, leaving the system in a condition ready for instantaneous and complete recovery of its interrupted operation on a restart after power restoration, and having completed any tasks which could not wait over until that time.

It is a second object of the present invention to provide a data processing system which transfers the contents of the processor's registers, upon receipt of indication of a power failure, to a volatile memory, which memory is alone maintained, for the duration of the power failure, by a low power auxiliary supply, if and only if the processor has successfully performed an ordered shutdown.

The invention is herein described, by way of example only, with reference to the accompanying drawings wherein;

FIG. 7 illustrates a simplified data save program.

Figure 1:
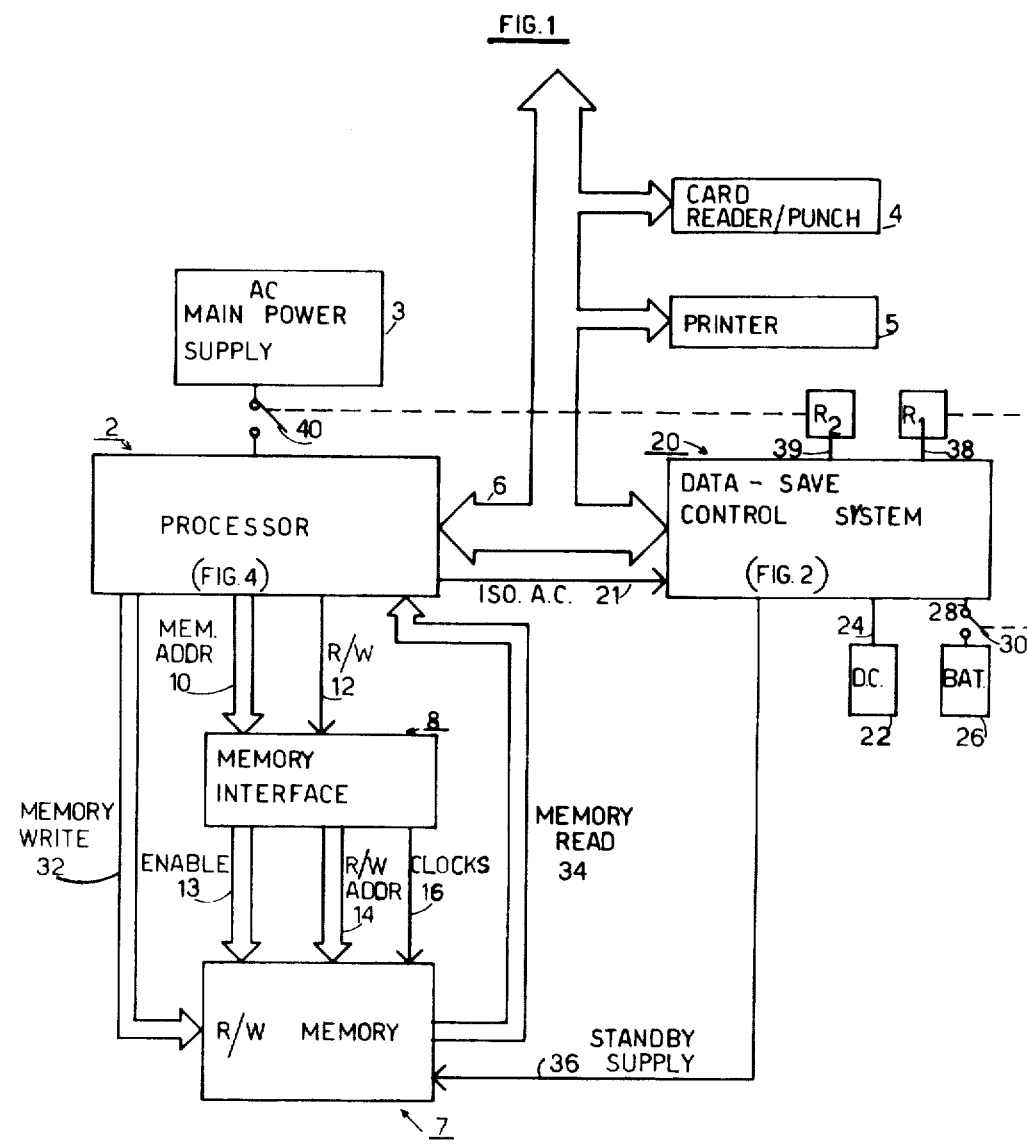
FIG. 1, is a block diagram of one form of data processing system constructed in accordance with the invention.

A system employing the present invention is illustrated in generalized form in the block diagram of FIG. 1. It includes a processor 2 supplied from an AC main power supply 3. The processor 2 is of the programmable type, for example that described in detail in U.S. Pat. Nos. 3,886,523, 3,930,236, and 4,005,391, all assigned to the same assignee as the present invention. The processor is adapted to communicate with a host of peripheral units for data transfer, readout, and storage, such as a card reader punch 4 and a printer 5, these being connected via a common bidirectional I/O (Input-Output) bus 6.

In addition, the processor 2 communicates with an external Read/Write memory 7 via a memory interface 8. The memory address for selecting one unique memory location for data retrieval or data deposition purposes, is supplied to the interface 8 via bus 10, and the Read/Write signal, indicating whether data is to be written into or retrieved from the memory (7) is fed via bus 12, the interface 8 in turn feeding to memory 7 and enable signal via bus 13, a Read/Write address via bus 14, and the clocks via bus 16.

Figure 4:
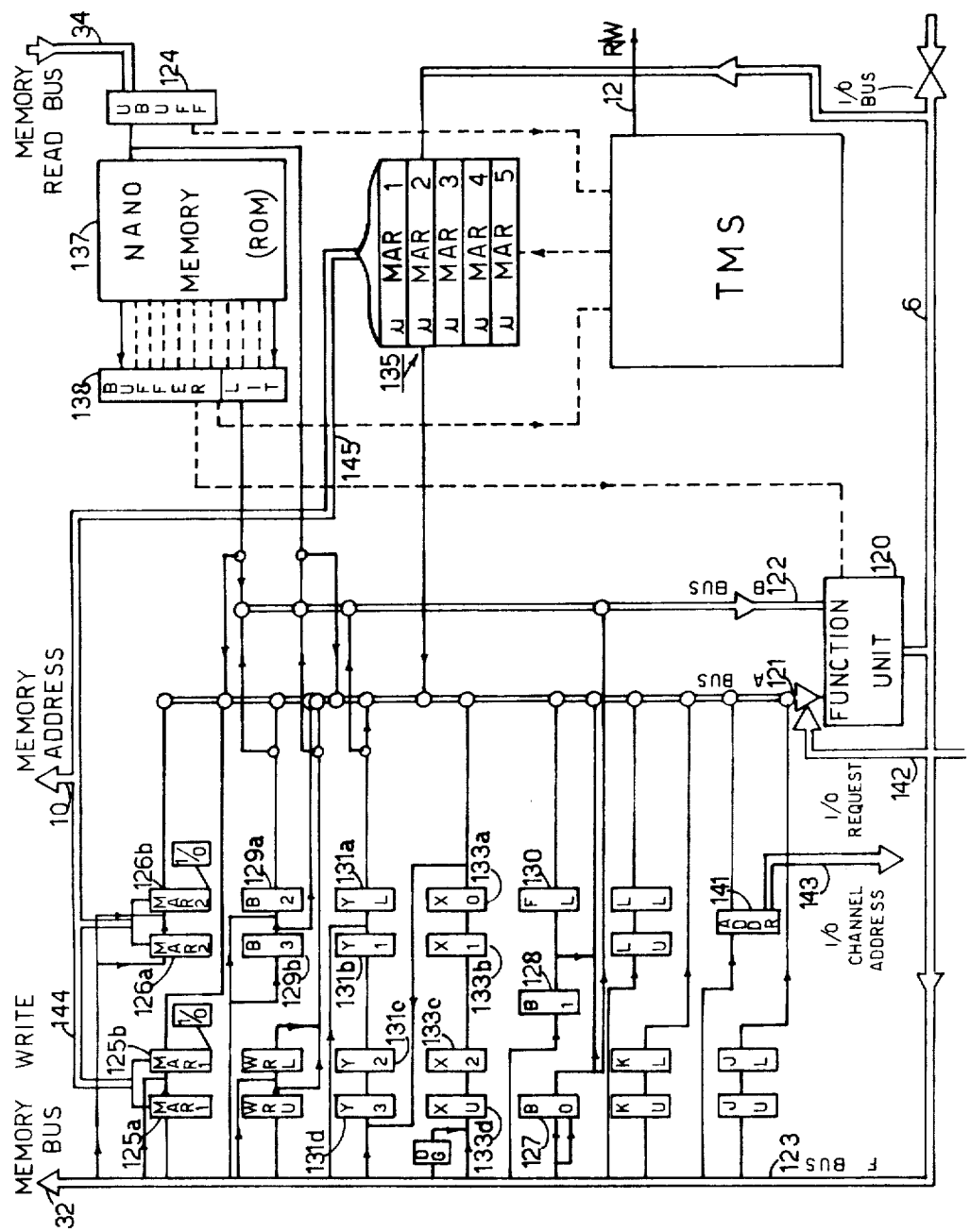
FIG. 4 is a block diagram of one known form of processor which may be used in the system of FIG. 1.

The specific construction and operation of the processor 2, and the manner of control of its various peripheral units 3, 4, do not form part of the present invention and therefore are not described herein in detail. A block diagram of a processor that may be used is illustrated in FIG. 4 and is described below to the extent necessary for an understanding of the present invention.

If desired, further details of the construction and operation of such a processor may be had by reference to the above-cited patents.

The present invention concerns primarily the preservation of the volatile data in the registers of the processor 2 in the event of a power failure in the AC main power supply 3. For this purpose, a data-save control system, generally designated 20 in FIG. 1, is coupled to the processor 2 via its bi-directional bus 6. The data-save control system is supplied with isolated AC via line 21 from the processor 2. In addition, the data-save control system includes a DC supply 22 connected to it via line 24, and one or more batteries 26 connected to it via line 28, the latter line including a cut-out switch 30. Upon the detection of a failure in the AC/main power supply 3 by a mains-fail detector within the data-save control system 20 as will be described more particularly below, the data-save control system is effective to monitor the transfer, via Memory Write bus 32, of the infotmation in the volatile data registers of the processor 2 to the external Read/write memory 7; and upon the detection of the restoration of the supply mains, the data-save control system 20 is effective to monitor the retransfer, via Memory Read bus 34, of the information from the Read/Write memory 7 to the volatile data registers of the processor. During the foregoing operation of the data-save control system 20, it supplies standby power, via bus 36 to the Read/Write memory 7 for a sufficient time to complete the transfer and retransfer operations.

Cut-out switch 30 in line 28 to the standby batteries is actuated by a relay R1 in line 38, which relay is controlled by battery chargers included in the data-save control system 20. In addition, the data-save control system 20 controls, via line 39, a circuit breaker relay R2 having contacts 40 in the mains to the AC power supply 3, such as to inhibit the reconnection of processor 2 to the main power supply until a predetermined time interval has elapsed following the restoration of the AC main power supply. All the foregoing operations, and the manner the data-save controller perfoms them, are described more particularly below.

Figure 2:
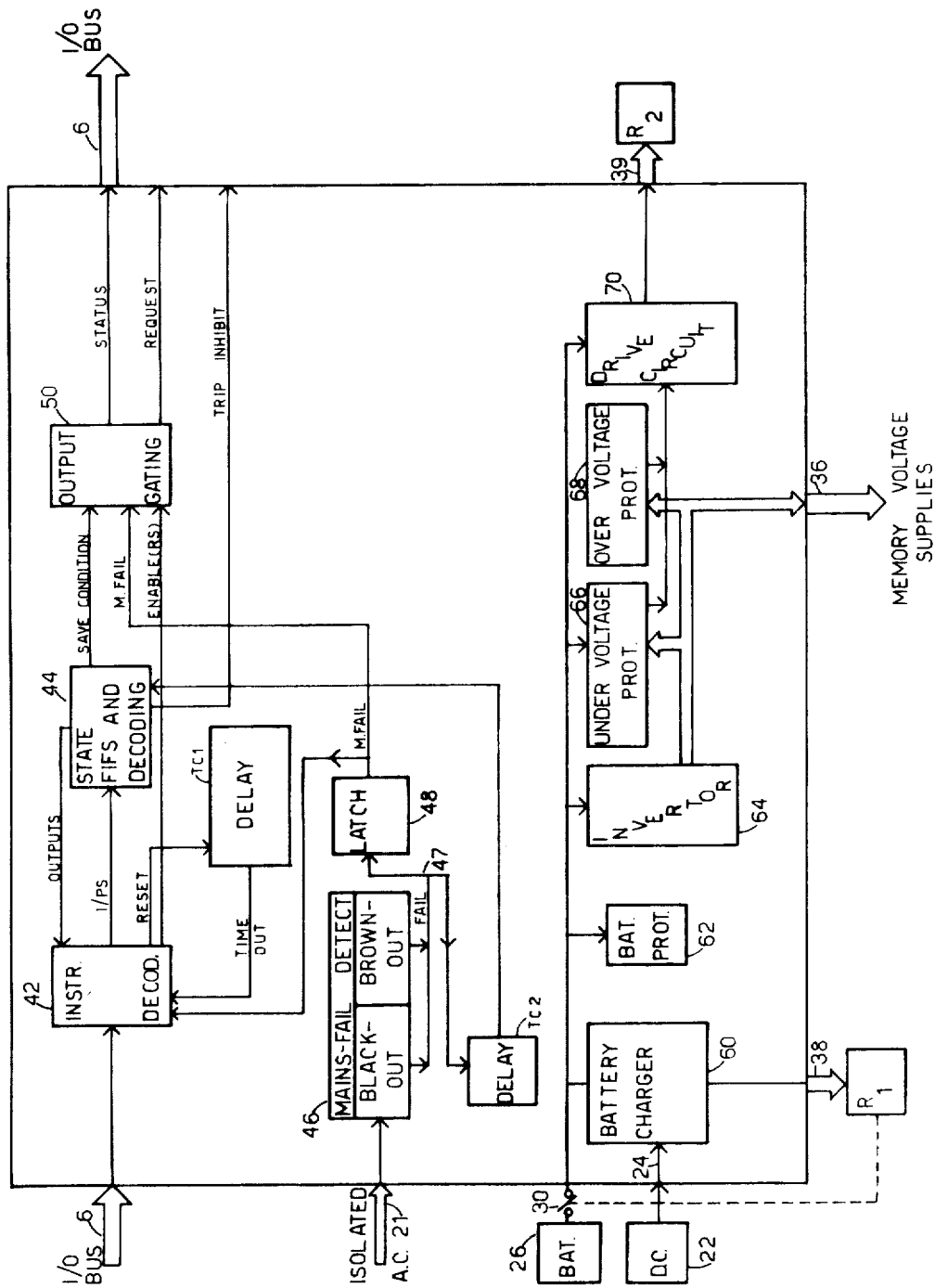
FIG. 2 is a block diagram of the data-save control portion of the system of FIG. 1.

FIG. 2 is a block diagram of the data save control system 20 of FIG. 1. The system comprises an instruction decoding unit 42, decoding the instructions received from the processor 2 via bus 6, a machine state control unit 44 including the logic network defining the state sequence of the controller; a first timer TC1, a mains-fail detector 46 detecting a failure (e.g. either blackout or brownout) in the AC main power supply 3 as sensed via the isolated AC input line 21; a latch 48 for latching the Mains-Fail signal received via line 47 from detector 46; a second timer TC2; and an output gating circuit 50 gating the output to I/O bus 6. The first timer TC1 is preferably a digital counter set to time-out 16 ms after actuation; it is used for timing in the state sequence. The second timer TC2 is preferably an R-C Schmidt trigger set to time-out about 0.5 to 2 seconds after actuation; it is used for restart timing. All the foregoing components, which may be implemented on a single IC Integrated Circuit) chip, constitute a Data-Save Controller, which Controller is described more particularly below with respect to FIG. 3.

The data-save control system 20 illustrated in FIG. 2 further comprises a battery charger 60 connected to the DC supply 22 via lead 24 and adapted to maintain the standby battery 26 (FIG. 1) fully charged by controlling cut-out switch 30 via its relay R1 in line 38; a battery under-voltage protection unit 62 guarding against the batteries becoming too deeply discharged; an inverter unit 64 for supplying the standby AC voltage to all the devices, including the external Read/Write memory 7 (FIG. 1) via line 36, during a Mains-Fail condition; an under-voltage protection unit 66 protecting inverter 64 against an under-voltage; an over-voltage protection unit 68 protecting the inverter against an over-voltage; and a drive circuit 70 which supplies driving current to circuit breaker R2 whose contacts 40 (FIG. 1) are in the AC supply mains.

The foregoing units, which can be implemented on one or more additional IC chips, may be of known construction, and therefore further details of their construction and operation are not deemed necessary.

Figure 3:
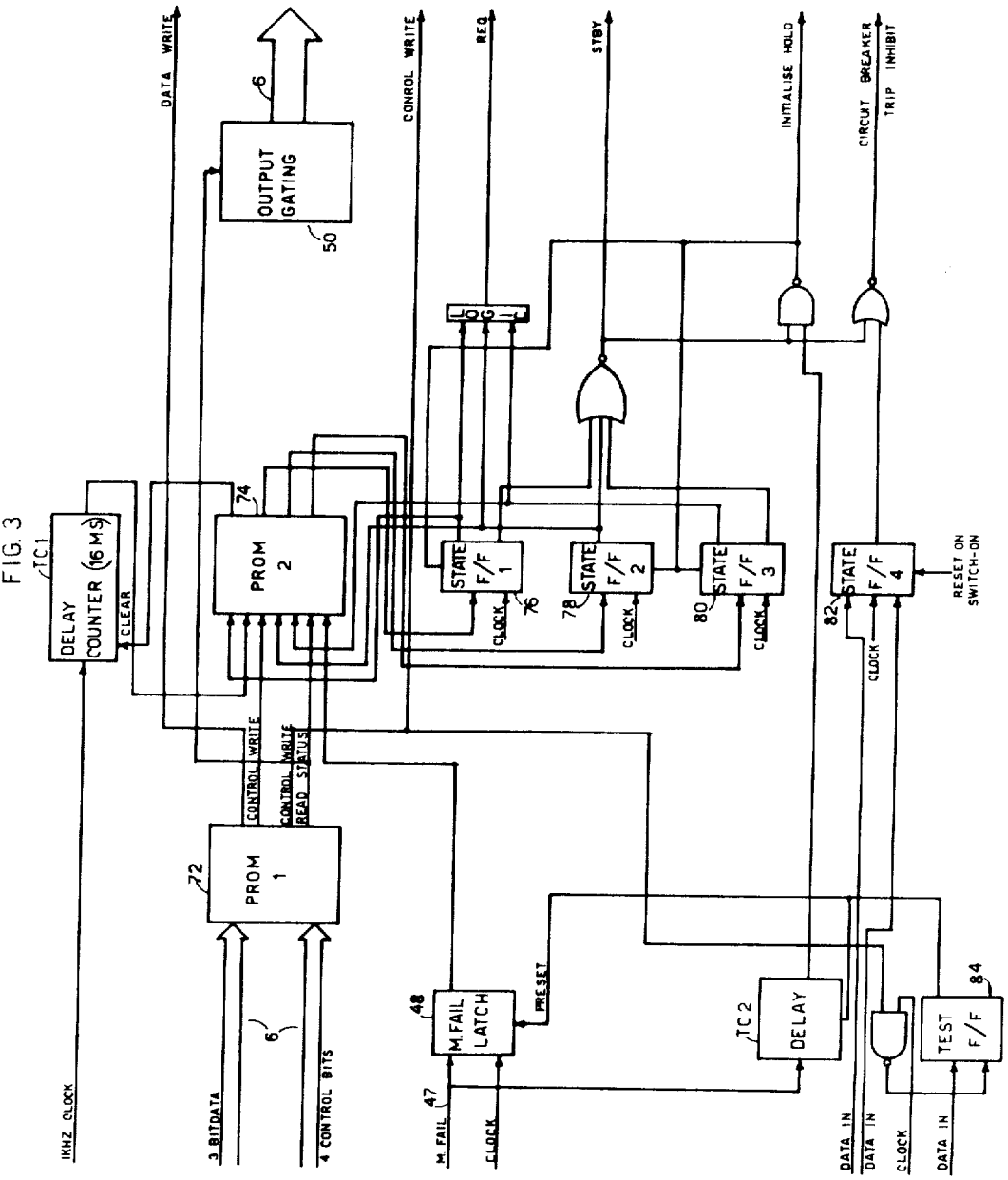
FIG. 3 is a logic diagram of the data-save controller in the system of FIG. 2.

FIG. 3 illustrates more particularly the data-save controller in the circuit of FIG. 2. The controller in FIG. 3 includes two fixed memory devices 72, 74, preferably PROM's (Programmable Read Only Memory Devices) which decode the inputs received from the processor 2 via I/O bus 6. The data-save controller further includes four J-K flip-flops 76,78, 80,82, three of which (76,78,80) define the existing state of the data-save controller, the remaining one (82) registering the success or otherwise of the Data-Save Operation. In addition, the controller includes the two previously mentioned timers TC1 and TC2 used for timing in the state sequence; the mains fail latch 48 for latching the Mains-Fail signal received from the mains-fail detector 46 (FIG. 2) via line 47; the output gating circuit 50 for gating the output from the controller via I/O bus 6 to the processor 2; and a test flip-flop 84 which is used during a testing operation to reset the mains-fail latch 48.

As indicated earlier, the data-save control system of the present invention may be used with different types of processors, FIG. 4 illustrating, for purposes of example, one form of processor 2 with which the invention may be used, the illustrated processor being that more particularly described in the above cited patents.

Briefly, the processor illustrated in FIG. 4 is one driven by micro-instructions made up of varying numbers of syllables, depending upon the function and literal values required. The processor employs two levels of subinstruction sets by which macro (or subject) instructions are implemented by strings of micro instructions all of which are implemented by control instructions. Each level of instruction sets may be stored in separate portions of memory, or even in separate memories, with the control instructions being stored in a Read-Only memory internal to the processor. The micro instructions are thus formed of varying numbers of syllables, with the different syllables being stored in a micro instructions memory and fetched in sequence under the control of a Machine State Control unit TMS to form the particular micro instruction. One syllable of each micro instruction is selected to indicate the particular combination of the function to be performed, the source and destination register to be employed, the particular busses which are to be used for data transfer, and the timing of micro instruction execution, i.e., the number of characters, digits, or bits to be operated upon during the micro instruction execution. When the particular micro instruction is formed of more than one syllable, the remaining syllables represent values or literals used as address parameters and also for logical operations.

As illustrated in FIG. 4, the processor 2 includes a function unit 120 to which data is supplied by A-bus 121 and B-bus 122, and from which data is received by F-bus 123. All data moves from the various registers through function unit 120. These respective busses are 8 bits wide, which is the basic width of all syllables and data segments employed in the system. A bus 121 and B-bus 122 receive information segments from the respective registers, and also from memory, by way of U-buffer register 124, which is also employed to supply 8 bit addresses to control memory 137.

The machine instructions or S-instructions (which may be a higher level programme language, such as Cobol) are implemented by strings of micro instructions which are stored in an external memory. Preferably, a portion of external memory 7 (FIG. 1) is used for this purpose, the memory being divided into separate portions including a Read-Only portion for the permanent storage of micro instructions to provide "bootstrap" facilities, and Read/Write portions for storing the S instructions, some micro instructions, and data, during the normal operation of the processor. In addition, the Read/Write portion of external memory 7 is used during the Data-Save Operation for storing the volatile data in internal registers of the processor upon the detection of a failure in the main power supply (3, FIG. 1), the information being retransferred back to the volatile data registers when the power supply has been restored, as will be described more particularly below.

The memory address registers MAR1 and MAR2 are identical 16-bit registers which operate in either the Transfer Mode or the Count Mode. In the Transfer Mode each register is arranged as two 8-bit byte registers 125a, 125b and 126a, 126b, both capable of being loaded from function unit 120 by way of F-bus 123. When in the Count Mode, each of the memory address registers is employed to address memory via a 16-bit output bus 144 connected to the memory address bus 10 (FIG. 1).

The processor includes the following additional registers; B0-Register 127 and B1-Register 128, which are single character general purpose registers; B2-Register 129a and B3-Register 129b, which are single character general purpose registers that may be concatenated to form a two-byte register; flag register 130, which is a single character register for storing general flags bytes; Y-Registers 131a-131d, and X-Registers 133a-133d, which may, respectively, be concatenated together to form two 4-byte registers or one 8-byte (16 digit) registers (XY); working registers WRU, WR1; and additional registers JU,JL,KU,KL, and LU,LL.

The processor 2 further includes micro address registers (μMAR1-5) 135 capable of being loaded from, or unloaded to, function unit 120. They can be arranged to form a push-down or last-in-first-out (LIFO), address stack for micro memory addressing and for storing program and interrupt routine addresses. This information is outputted via 16-bit micro memory address bus 145 and the memory address bus 10 (FIG. 1) to the memory interface unit 8.

In addition, processor 2 further includes U-buffer register 124, which is an 8-bit register used for addressing control memory 137 and for providing information about the next micro instruction to be executed. This information is used to generate overlap of the micro instruction fetch and execution phases. Upon the accessing of control memory 137, a control instruction is supplied to control buffer register 138, which holds the signals of a control instruction during the time required for its execution.

The input-output interface of the processor via I/O bus 6 comprises I/O address bus 143 connected to I/O address register 141, and I/O request bus 142. I/O address register 141 is an 8-bit register used to address a plurality of bi-directional I/O channels or control units, and is loaded from, or unloaded to, function unit 120.

Further details of the construction and operation of the processor may be had by reference to the above-cited patents. For purposes of the present invention, suffice it to point out that all the above-mentioned registers illustrated in FIG. 4 are internal to the processor; and that all, except those of the control memory 137 and the micro address registers 135, are adapted to contain volatile data which is to be saved in the event of a mains failure by the immediate and automatic transfer of the information from the volatile registers to the external Read/Write memory 7 supplied by the standby power supply via bus 36, the information being automatically transferred from the external memory 7 to the processor registers upon the restoration of the mains, the transfer and retransfer of such information during a Data-Save Operation being monitored by the data-save controller in the control system 20 of FIGS. 1 and 2.

Figure 5:
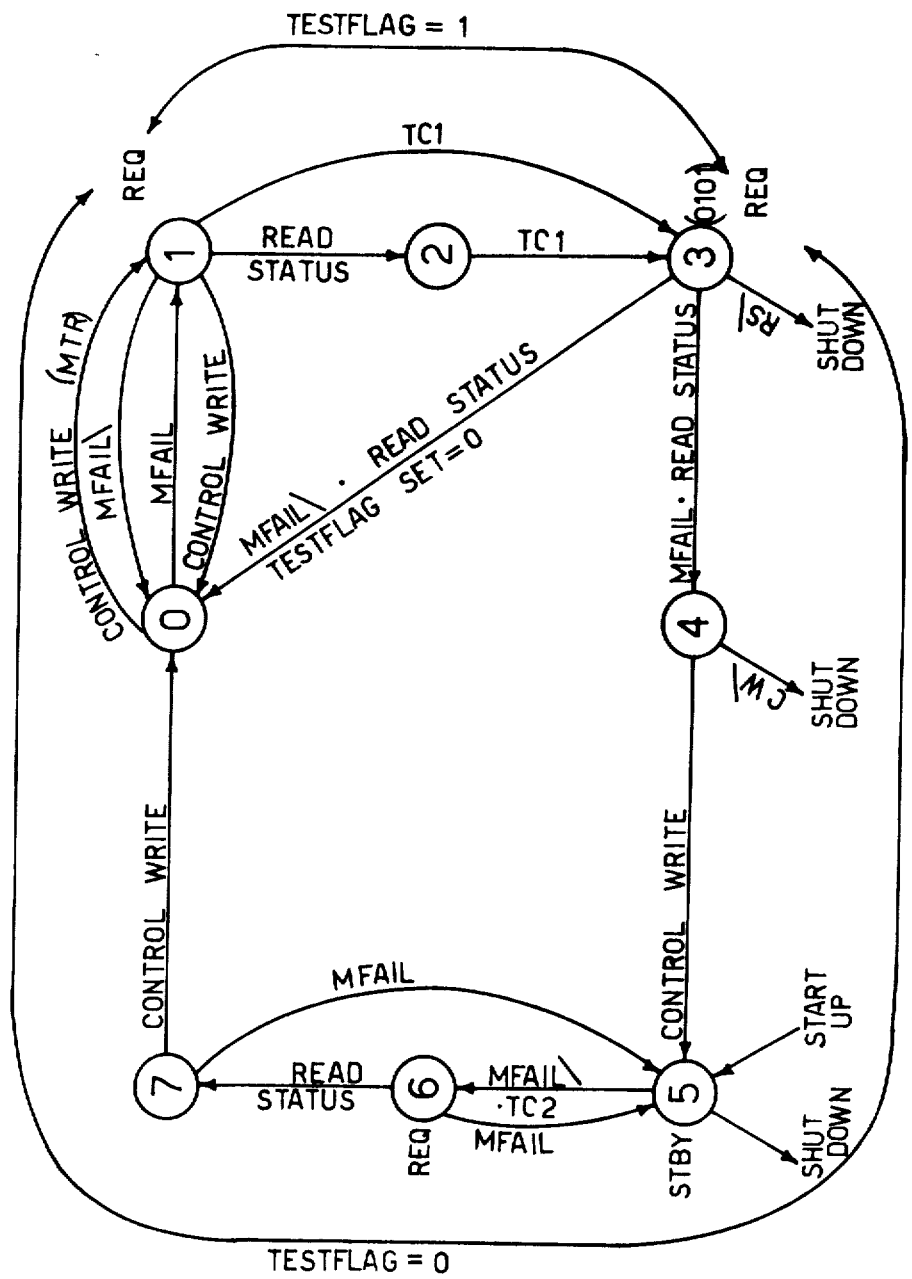
FIG. 5 is a state diagram illustrating the sequential operation of the machine state control unit defined by the logic network in the data-save controller of FIG. 3.

The state diagram of FIG. 5 illustrates the manner in which the data-save controller of FIG. 3 monitors the transfer of the information from the volatile registers in the processor 2 to the external Read/Write memory 7 upon the detection of a mains failure, and the retransfer of the information back to the registers upon the restoration of the supply mains. As pointed out above, the state sequence of the data-save controller is defined by the logic network of the controller illustrated in FIG. 3.

State-0 is the initialized state of the controller, in which the data-save condition flip-flop 82 (FIG. 3) is reset, and the mains-fail latch 48 outputs a low level signal to fixed memory device 74. In State-0, the controller can be affected by:

(1) the Mains-Fail signal from latch 48 going high, indicating that the mains-fail detector 46 (FIG. 2) has detected a failure (either black-out or brown-out) in the AC main power supply 3 (FIG. 1) or (2) Control Write signal being generated by the processor 2 with a specified data word.

In the event either of these conditions occurs, the controller moves to State-1, generating a Request for access to the memory, and in addition, actuating the delay counter TC1 which counter times-out at 16 ms. If the Mains-Fail signal goes high, it is latched by latch 48 and is thus synchronized to the system clocks in order to obviate timing errors.

The provision for moving the controller from State-0 to State-1 by a Control Write signal, is a test facility to enable simulation of a "mains failure" from the processor.

State-1 is a Request State, in which the controller requests the processor for access to the memory. If, while the controller is in State-1 the Mains-Fail signal returns low indicating that the supply mains has been restored, the controller returns to State-0. As indicated above, the controller will also return to State-0 if the processor sends a control Write signal for testing purposes. In this case, the Control Write signal sets the Mains Mail latch 48 via test flip-flop 84 (FIG. 3). The latter flip-flop is also actuatable by a Data In signal from the processor to reset the latch, this facility enabling the data-save operation to be inhibited during initial loading of the memories by causing the controller to toggle between States 1 and 0.

If, the controller, while in State-1 receives a Read Status signal from the processor, the controller moves to State-2. This is a transitional state, and starts timer TC1. If no recognisable change or signal is recorded during a time period of 16 ms, timer TC1 will run-out, and the controller will move to State-3.

If no Read Status signal is received from the processor while the controller is in State-1, timer TC1 will also run out after 16 ms, whereupon the controller will move directly from State-1 to State-3.

In State-3, the data-save controller generates another Request signal for access to the memory. If, when the responding Read Status signal from the processor is received by the Controller, the Mains-Fail signal has returned low (indicating that the main power supply has been restored), the controller will move to its initialized State-0. If however, the Mains-Fail signal is still high, the Read Status signal will cause the controller to move to State-4. If no Read Status signal is received from the processor, the controller will lock-out in State-3.

Whenever there is a Request from the data-save controller, the processor reads the status, and all other interrupts are ignored. By reading the status, the processor can determine if the controller is in State-1 or State-3. A test flag is used for this purpose, the test flag being a dedicated bit in a register (e.g. flag register 130, FIG. 4) set or reset in order to differentiate between States 1 and 3. Thus, the test flag is set high after State-1, low after State-3, and is low in the other States 4, 5, 6, 7 and 0. If the data-save controller generates a Request signal before a data-save operation has been executed (this being recognized by the processor in the manner described below), the processor examines the state of the test flag. If the test flag is not set, the controller is in State-1; if the test flag is set, the controller is in State-3, and preparations must be made before shut down.

While the controller is in State-4, the processor executes a stored data-save-operation program whereby it effects a transfer of the information from its volatile registers to a non-volatile portion of external memory 7 (FIG. 1). In State-4, the processor can also complete the current instruction and usually several more until a convenient point to stop is reached at which point it can then transfer the required registers to the memory for retention.

The data-save-controller remains in State-4 until it receives a Control Write Signal from the processor indicating that a successful Data-Save -Operation has been completed, i.e. that the information in its volatile registers has been transferred intact into the non-volatile portion of external memory 7. If no such Control Write Signal is received by the controller, it will lock out in State-4. Upon receipt of Control Write signal indicating that a successful Data-Save Operation has been completed, the controller moves to State-5.

The data save controller remains in State-5 until the Mains-Fail signal from detector 46 and latch 48 returns low, indicating that power has been restored. All the while the Mains-Fail signal is high, the system remains in the Standby Mode, wherein the state flip-flops 76, 78, 80, 82 (FIG. 3) of the data-save controller, and the external memory 7 together with its refresh circuitry and clocks, are powered by the standby batteries 26 via line 36 (FIG. 1.)

When the power is restored, the Mains-Fail signal goes low, but the data save controller will wait in State-5 and not move to State-6 until timer TC2 (FIG. 2) times out. As indicated above, this timer is an RC Schmidt trigger circuit. It may be present to time-out after about 1 second and provided to ensure that start-up control is by the data-save controller. It prevents the possibility that the processor may examine a Request signal before the data-save controller has had a chance to generate one in State-6, i.e., before the information from the memory has been restored into the appropriate registers by the Data-Save Operation. The timer is triggered by the Mains-Fail signal going high upon the restoration of the power to ensure the discharge of its timing capacitor, so that if power returns upon the controller entering State-5, the time-out will still have to run. It also ensures that on reaching State-5, the state flip-flops (76, 78, 80, 82, FIG. 3) can be locked in that state independently of clocks and input data, thereby reducing the number of devices required to be powered during the Standby mode. As soon as the time (e.g. 1 second) present in timer TC2 has run out from the time the controller has moved to State-5 (and assuming the Mains Fail signal has gone low, indicating power has been restored), the controller moves to State-6.

When the data-save-controller is used with the processor illustrated in FIG. 4, the first address register μMAR1 of its micro memory address store 135 is reset, and the processor executes a programme stored in a non-volatile memory portion of the external memory 7, whenever the power is switched on, or a Request is generated by a controller indicating a requirement for updated information or similar action by the processor. The programme executed by the processor first instructs the processor to store the address of the location, held in the memory address register (μMAR1) before interruption, in a subsidiary register (μMAR3), so that the processor can return to that address after servicing the Interrupt on receipt of an Enable Return signal. If the system has only been switched on, there being no volatile data to be saved, no Enable Return signal will be exectuted, and instead, the address of the first instruction required in the volatile store will be entered into the first address register (μMAR1) of the micro address store 135.

After temporarily storing the original memory address, the programme stored in the non-volatile memory determines if there is a Request from the data-save controller. If there is no request, indicating that no data has been saved, the processor generates a Read Status signal moving the data-save controller from State-6 to State-7. A Control Write signal is then sent from the processor, which moves the controller from State-7 to the initialized State-0.

If the mains should fail while the controller is in State-7, the controller will immediately return to State-5.

As indicated earlier, the processor can identify either of the Request States 1 or 3 by examining the Test Flag (e.g. in flag register 130, FIG. 4), the Test Flag being reset in State-1 and set in State-3.

Both of the above States 1 or 3 can occur only when the Mains-Fail signal is high, indicating a failure in the supply mains. If Mains-Fail signal is low , however, indicating that the power has been restored, and a Request is generated by the controller, this means that the controller is in State-6. In this state, the data-save condition flip-flop 82 (FIG. 3) is set, indicating that the volatile register information of the processor is stored in the non-volatile portion of its external memory 7. The processor thereupon retransfers retransfers the volatile information from external memory 7 back to the volatile registers within the processor, and generates a Control Write signal, resetting the data-save-condition flip-flop 82, and moving the controller from State-7 back to its initialized State-0.

Now, with the data save controller initialized, other Requests can be serviced.

Figure 6:
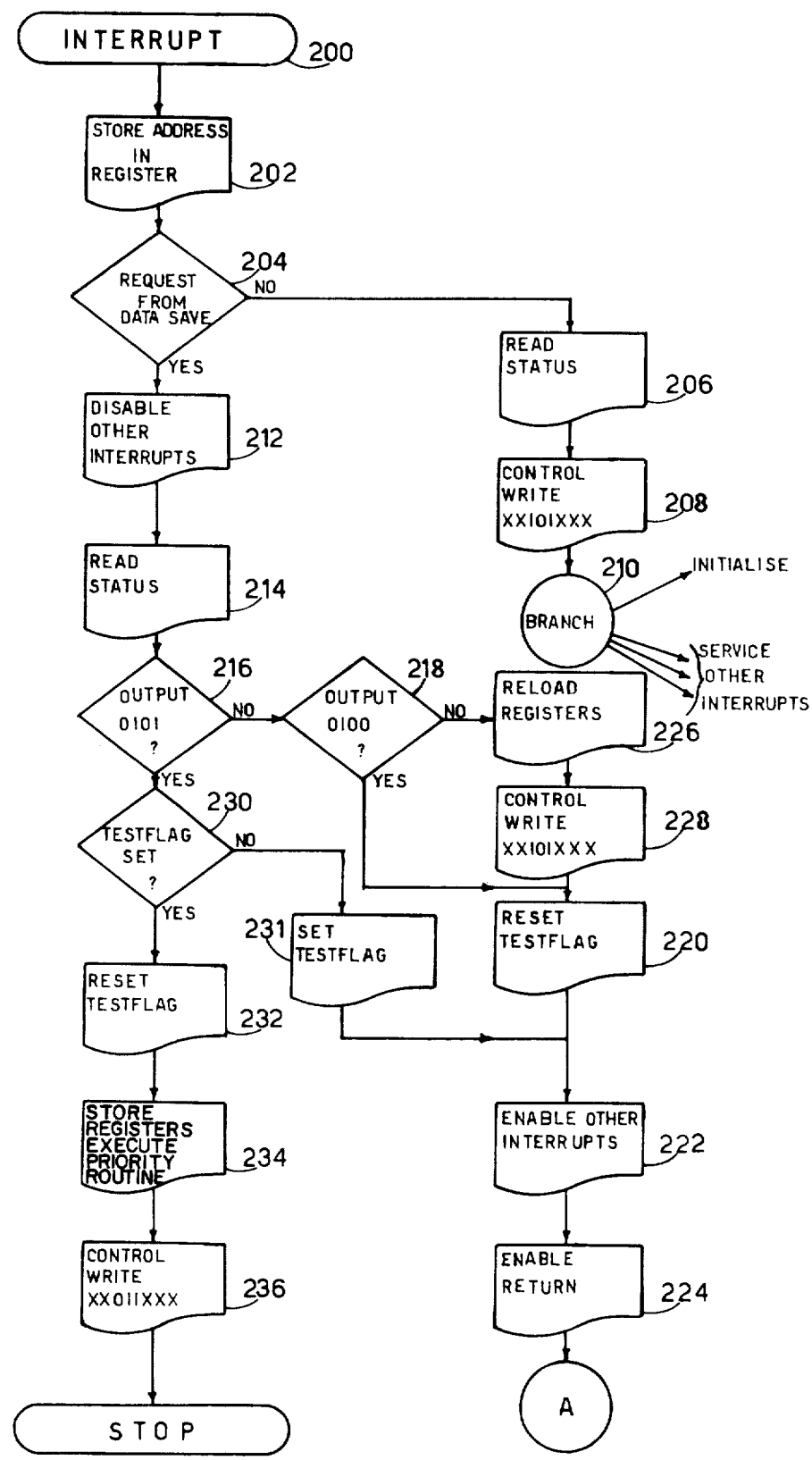
FIGS. 6 and 6a illustrate one simplified program which may be used for performing an interrupt routine in a Data-save Operation.
Figure 6A:
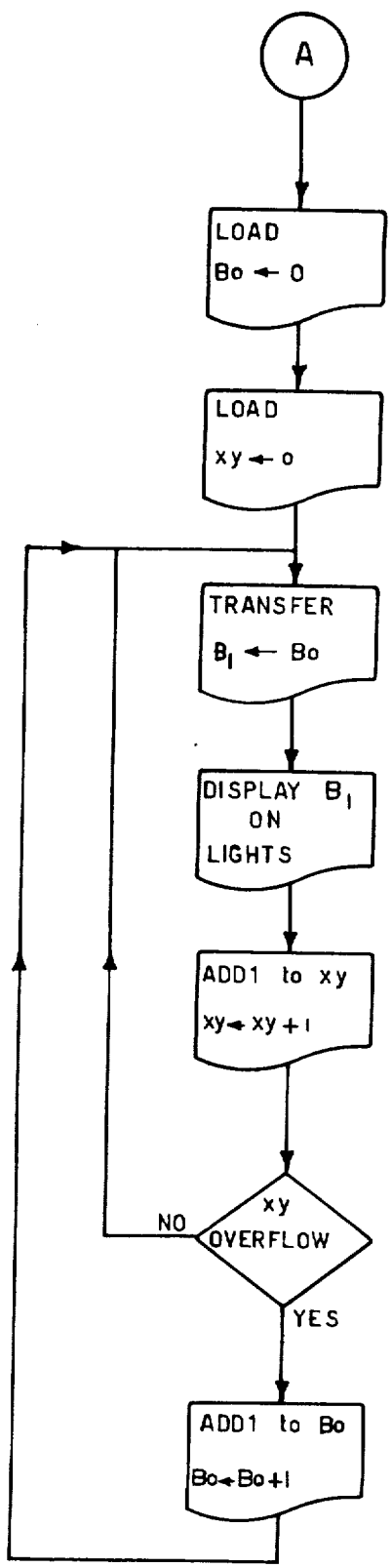

FIGS. 6 and 6a illustrate a simple programme that may be used with the described data-save controller for performing an Interrupt routine upon receiving a Request from the data-save controller or from any other peripheral unit.

Briefly, if the power is switched on, or a Request for access to the memory (through the processor) is received, the memory address register ($\mu$MAR1, FIG. 4) is reset, and the machine executes a programme stored in the non-volatile ROM memory (137, FIG. 4). The latter programme first instructs the machine to store, in a subsidiary register ($\mu$MAR3), the address of the location held in the memory address register ($\mu$MAR1) before the Interrupt, so that the machine can return to that address after servicing the Interrupt on receipt of the Enable Return. If the machine has only been switched on, no data having been saved, no Enable Return will be executed and, instead, the address of the first instruction required in the volatile store will be entered into the address register ($\mu$MAR1).

Thus, with reference to FIG. 6, upon receiving the Interrupt (block 200) and after temporarily storing the original memory address (block 202), the processor determines if there is a Request from the data save controller (block 204). If there is no Request, indicating that no data had been saved, the processor generates a Read Status command (block 206) moving the Data-Save State Machine from State-6 to State-7. (As described earlier, the transition from State-5 to State-6 is automatic if the mains has returned (MFail low) and the time constant TC2 has elapsed). A Control Write command (block 208) is then issued which moves the controller from State-7 to the initialized State-0. Now, with the data save controller initialized, other Requests can be serviced, or the machine registers can be initialized, i.e. set to a known state enabling software execution (block 210).

If there is a Request from the data-save controller (block 204), all other Interrupts are ignored (block 212) and a Read Status command is issued (block 214) to enable the processor to determine whether the controller is in State-1 or State-3. Both of these states are characterized by the outputs 0101; if the output is not 0101 (determined in block 216) but rather is 0100 (determined in block 218), this indicates that the controller is in State-1 or State-3 but the mains have returned (MFail is low). In such a case, the controller will have been reset to its initialized State-0 as described above, and the software now returns the operation to its original programme, by resetting the Test Flag (block 220) enabling other Interrupts (block 222). An Enable Return is then executed (block 224), returning the original programme address from $\mu$MAR to $\mu$MAR1.

If the output received as a result of the Read Status command (block 214) is neither 0101 (block 216) nor 0100 (block 218), the only other Request state is State-6 indicating the register contents are stored in the memory by the setting of the Data Save Condition Bit (DSCB), i.e. flip-flop 82, FIG. 3. The processor then reloads the registers (block 226) and generates a Control Write (block 228) resetting the DSCB flip-flop 82 and moving the controller from State-7 to the initialized State-0. The Test Flag is reset (block 220); the Interrupts are enabled (block 222); and an Enable Return (block 224) is executed returning the machine to the control of software.

On the other hand, if the output received as a result of the Read Status command (block 214), is 0101, this indicates that the controller is either in State-1 or State-3. As described above, the Test Flag, which is a dedicated bit in a register (e.g. flag register 130, FIG. 4), is used for distinguishing between State-1 and State-3). Thus, the condition of the Test Flag is examined (block 230), and if it is found that it is not set, the controller is in State-1; the Test Flag is then set (block 231). If the Test Flag is found to be set, the controller is in State-3, and preparations must be made before shut-down.

The Test Flag is reset (block 232), the relevant registers are stored (block 234); and a Control Write command is generated (block 236) bringing the controller to State-5. A dynamic loop is then set up awaiting shut-down.

FIG. 6a illustrates the software loop which may be used in this example. It is a simple counting loop using the XY-register (namely the X-register and the Y-register concatenated to make a 16-bit register), and the B0 and B1 registers. Counting into the XY-register acts as a delay between increments to the B0-register. The B1-register is used because of association and easy access to a display peripheral unit.

When interruption to the counting occurs and it is the result of a mains failure, the contents of the XY, B1 and B2 registers are stored in the memory. In this case, it is not necessary to use the registers to hold the count. After each increment, the data could be stored in a dedicated location, thus obviating the need to transfer the data to the store in the event of a shut-down. It should be noted that transfer of information from the registers to store is achieved by the use of programme codes opening data paths and writing that data into locations, the addresses of which are again set up by software instructions. Recall of the data is achieved by the same method.

The operation of the data-save controller requires that the computer be fully powered by capacitive means for at least 20 ms after the failure, partial or total, of the mains supply. This allows 4 ms to complete computations and information transfer to the memory.

It is possible, theoretically, to save the data in every register in the process if required, subject to the limitation that in the described embodiment there are only 4 ms available to do this. However, the normal practise would be to interrupt the operation at a point where the minimum number of registers will be required to be transferred to the store (external memory 7, FIG. 1) for retention.

Attention is drawn to FIG. 7, showing, by means of a flowchart, the procedure followed by the processor software when performing a data save operation in state 4 of the controller. The processor, under control of its data save software, firstly determines whether or not the current operation if one that may be terminated immediately. If it may be so terminated, as might be indicated by the presence of a mask on the interrupt being present or absent, then the processor's register contents are stored straightaway. If it may not be so terminated, it is taken to completion, and only then are the register contents stored. The register contents stored are those contents consistent with a restart. For example, if an operation is straightaway abandoned, and intermediate results are lost, then the register contents stored are those consistent with the start of the abandoned operation, so that it may be done again when power is restored. If no intermediate results are lost from the immediate abandonment of an operation, then the register contents stored are those existing at the moment of abandonment. If an operation is taken to completion, the register contents stored are those consistent with the start of the next consecutive operation, so that the processor system may carry on with its programme when power returns.

The register contents having been adjusted and saved consistently with a restart, the processor next turns its attention to the performance of any outstanding, necessary, priority tasks which it is desirable to complete before final loss of power.

At the instant of entering state 4, the processor software starts timing operation whereby it knows how much time has elapsed, and therefore how much time remains before power failure is complete. The processor system has, resident within it, a list of priority tasks. The processor consults this list and selects the task with highest priority, computing the time required for its completion and comparing that time with the remaining time available before all power is lost. If there is sufficient time to complete the selected task, the task is performed. If there is not sufficient time to complete the task, the task is deleted from the list of priority tasks, and the task with the next highest priority is selected and treated in the same manner. After the completion of any priority task, it is deleted from the list and the list is consulted again, a new task being selected on the same basis. If no task can be found that can be accomplished in the remaining time, the processor stops. In this way, remote data links, where a word would be corruptly lost if the completion of its receipt or sending was not allowed, the signalling of a shutdown condition to other processor systems in a net, and other similarly essential operations, not able to be left over until a restart, are accomplished.

It is particularly to be appreciated that the data save controller, while being an integral part of the preferred embodiment, as described, is not essential to the operation of the system within the spirit of the present invention, and may functionally be replaced by software operating on the processor.

It is also to be appreciated that the volatile memory, maintained in the preferred embodiment by the conditional connection of a battery, may be replaced by a non volatile memory.

In a second preferred embodiment of the present invention, all of the members of the first preferred embodiment are present and functional as before, excepting the omission of the battery charger (60), the battery protector (64), the invertor (64), the under voltage protection (66) and the over voltage protection (68) the memory (7) being replaced by a non volatile memory.

In a third preferred embodiment of the present invention, all members of the first preferred embodiment are present and functional as before, with the exception of TC1, where the processor system responds instantaneously to the indication of a black out or brown out, instead of waiting to check that it persists.

It is considered a first inventive aspect of the present invention that a data processing system is provided with a plural indicating mains fail detector which provides first indications in the event of the supply potential having fallen below one or more predetermined levels, and second indications in the event of the first indications having persisted, uninterrupted, for more than one or more predetermined time intervals.

It is considered a second inventive aspect that a processor system is provided with a volatile memory which is maintained in a non volatile condition during a power failure if and only if the processor has performed a successful data save operation.

It is considered a third inventive aspect that a data processing system performs a data save routine, prior to power failure, wherein current operations are taken to a convenient point, and then register contents stored appropriately for a restart, and whereafter essential priority tasks, unable to be left until a restart, are serviced on a priority and available time basis.

While the invention has been described with respect to one preferred embodiment, it will be appreciated that many variations, modifications and other implementations of the invention may be made.

What I claim is:

1. A data processing system comprising:
   a processor with volatile registers;
   a data memory;
   an AC power source;
   a detector for monitoring said AC power source for failure, and for providing to said processor a first indication of failure when said AC power source falls below a predetermined voltage, a second indication whenever said failure has endured for longer than a first predetermined period, and a third indication of restoration of said AC power whenever said AC power source exceeds said predetermined voltage for longer than a second predetermined period;
   a power supply receiving energy from said AC power source for delivering power to said system during normal operation, said power supply storing sufficient energy in its internal components to continue to deliver power subsequently to said first indication of failure for said first predetermined period and for a third predetermined period for data transfer;
   said processor responding to said first indication of failure to perform the following functions constituting a data save operation during said first predetermined period, a data save indication being provided when said functions are successfully completed, said functions including:
   (a) completion or reinitialization of the current processor task in preparation for recommencement of operation, said reinitialization including returning said volatile registers used for said current processor task to the same state as at the beginning of said current processor task;
   (b) selecting tasks for recommencement of operation according to priority by checking each task beginning with the highest priority task to ascertain if sufficient time remains to complete the task during said first predetermined period, and performing those tasks able to be completed during said first predetermined period;
   (c) and upon subsequent receipt of said second indication and during said third predetermined period for data transfer, transfering the contents of said volatile registers to predetermined locations within said data memory, and storing a data save indication in said data memory only when said data save operation is successfully completed, said processor returning to its condition prior to said first indication of failure and resuming said current task if said second indication is not received at the end of said first predetermined period;

an energy store responding to the presence of said data save indication for supplying said data memory with power during said failure, said data memory being a volatile memory; and, said processor, upon receipt of said third indication, recovering from said failure by retrieving said contents of said volatile registers from said data memory and restoring them to said volatile registers.

2. A system as recited in claim 1 comprising: a control memory loadable by said processor with a control character, said data save indication indicative of the completion of said data save operation and wherein said energy store is responsive to the contents of said control memory to supply power to said volatile memory if and only if said control character is contained therein.

3. A system as recited in claim 2 wherein said control memory comprises one or more storage locations within said volatile memory.

4. A system as recited in claim 3 wherein said energy store comprises an electrical batter.

5. A system as recited in claim 4 comprising a charger for charging said battery with energy derived from said primary power source.

6. A system as recited in claim 5 wherein said detector provides said first indication of any voltage peak from said AC power source being less than a predetermined value and wherein said first predetermined period is less than one AC cycle.

* * * * *

UNITED STATES PATENT AND TRADEMARK OFFICE
CERTIFICATE OF CORRECTION

PATENT NO. : 4,458,307

DATED : July 3, 1984

INVENTOR(S) : James C. McAnlis, et al.

It is certified that error appears in the above-identified patent and that said Letters Patent is hereby corrected as shown below:

Col. 8, line 67, delete second occurrence of "retransfers".
Col. 10, line 60, delete "if" and substitute --is--.
Claim 4, line 8, delete "batter" and substitute --battery--.
Claim 5, line 11, delete "primary" and substitute --AC--.

Signed and Sealed this

Third Day of September 1985

[SEAL]

Attest:

DONALD J. QUIGG

*Attesting Officer*    Acting Commissioner of Patents and Trademarks - Designate